Patented Jan. 1, 1946

2,392,100

UNITED STATES PATENT OFFICE 2,392,100

MANUFACTURE OF HALO ALKOXY DERIVATIVES OF FATTY ACIDS

Donald Price, New York, N. Y., and Richard Griffith, Fairhaven, N. J., assignors to National Oil Products Company, Harrison, N. J., a corporation of New Jersey No Drawing. Application June 3, 1943, Serial No. 489,460

19 Claims. (Cl. 260—408)

This invention relates to a process for preparing halo-alkoxy derivatives of aliphatic carboxylic acids, and in some of its more particular aspects, to the preparation of chlor-alkoxy derivatives of the higher fatty acids.

The halo-alkoxy derivatives of the fatty acids, such as chlor-methoxy stearic acid, are of potential commercial interest, being adapted to a variety of uses, for instance as plasticizers in synthetic masses, lubricant additives and the like. Moreover, these compounds, by virtue of their reactivity at two points, viz., the halogen atom and the carbonyl group, offer attractive possibilities as intermediates in the synthesis of more complex substances. The only synthesis proposed for these compounds to date, however, involves the use of tri-nitro mono-brom methane, the cost of which is prohibitive from a commercial standpoint.

It has been discovered by this invention that the elementary halogens will react upon alcoholic solutions of the unsaturated aliphatic carboxylic acids, or derivatives thereof such as the esters, amides or the like. Halogen atoms, and alkoxy groups derived from the alcohol solvent, add on to the carbon atoms connected by the unsaturated linkages in the unsaturated fatty compounds, yielding the corresponding halo-alkoxy derivatives. If the aliphatic acids themselves are employed in a reaction according to this invention, these acids will simultaneously be esterified by the free alcohols present in the reaction mixtures. The resultant compounds may be used without further chemical alteration, for a wide variety of purposes and, in the case of the derivatives of the higher fatty acids, are particularly useful as plasticizers in various synthetic masses. The products produced according to this invention may also serve as valuable starting materials in the synthesis of more complex substances.

The process of this invention is preferably carried out by mixing the selected unsaturated aliphatic acid or derivative thereof with an alcohol, the alkoxy group of which it is desired to add on to the aliphatic compound. Chlorine or bromine is then slowly introduced into the reaction mixture, with sufficient agitation to insure homogeneity of the mixture. A reaction ensues, whereby a halogen atom, and an alkoxy group corresponding to the alcohol, add on respectively to the carbon atoms connected by each of the double bonds in the unsaturated aliphatic compound. At the completion of the reaction, indicated by the refusal of the reaction mass to take up further quantities of halogen, the halo-alkoxy derivative may be recovered by distillation or other appropriate manipulation.

The temperature of the reaction mass during the introduction of the halogen should preferably be maintained as low as is consistent with a satisfactory rate of reaction, in order to suppress undesired side reactions such as halogenation or oxidation. Temperatures in the range from 0° to 25° C., and preferably in the range 5° to 10° C., are generally most favorable from this standpoint. The time required for completion of the reaction will, of course, vary with the temperature at which the reaction is conducted, the nature of the reactants being treated, and the rate at which the halogen is added. The completion of the reaction is readily apparent when the reaction mass ceases to take up any further amounts of halogen. Usually the reaction will be complete within 2 to 3 hours.

Referring to the unsaturated aliphatic acids and derivatives thereof suitable as starting materials in the practice of this invention, these may be any unsaturated aliphatic acids or derivatives thereof containing 3 or more carbon atoms in the acyl portion of the molecules thereof. Suitable unsaturated fatty acids are exemplified in acrylic, crotonic, oleic, ricinoleic, linoleic, linolenic, elaidic, erucic, brassidic, clupanodonic and the like unsaturated fatty acids, the individual molecules of which contain 3 or more carbon atoms. In place of the pure acids, there may be employed mixtures containing acids of the types above indicated as suitable such as, for instance, the mixed acids derivable from unsaturated animal, vegetable and fish oils on the order of olive oil, linseed oil, teaseed oil, corn oil, castor oil, cottonseed oil, rapeseed oil, soyabean oil, whale oil, pilchard oil, menhaden oil, sperm oil and the like. Likewise there may be employed mixtures which contain large proportions of unsaturated fatty materials, such as tall oil and the various derivatives thereof. In place of the free acids, there may be employed any suitable derivatives thereof such as the esters, amides and the like. Suitable esters are the methyl, ethyl, propyl, glyceryl and like fatty esters. Various natural oils of the aforesaid types containing substantial degrees of unsaturation will provide a very convenient source of unsaturated glyceryl esters.

Alcohols which may be advantageously reacted according to this invention, include any of the primary or secondary monohydric alcohols such as methyl, ethyl, propyl and isopropyl, butyl, isobutyl, amyl, octyl, decyl and dodecyl alcohols; and polyhydric alcohols such as the glycols and glycerol. The tertiary alcohols are not sufficiently reactive to combine with unsaturated groups, and accordingly cannot be employed for this purpose. Mixtures of suitable alcohols may be employed, in which case mixed products will result, examples of suitable mixed higher alcohols being the products obtained by hydrogenating the fatty acids derived from the natural fats and oils. The selected alcohol is preferably furnished to the reaction mixture in substantial excess in order to promote the main desired reaction, i. e., formation of halo-alkoxy derivatives at the expense of undesired side reactions such as halogen addition and substitution. Moreover, in most cases, an excess of alcohol may be removed from the final reaction products much more readily than an excess of unsaturated fatty acid or derivative. In general, the desired result may be obtained by the use of approximately 50% or more excess of the alcohol above the amount theoretically required.

Only the typically reactive halogens, chlorine and bromine are suitable reagents for use in this invention, fluorine and iodine being inoperative. Accordingly, the use of fluorine and iodine is excluded from the scope of this invention.

The reactions of this invention may be promoted by the use of suitable acid catalysts, such as the aryl sulfonic acids, sulfuric acid, potassium acid sulfate and the like. Such catalysts will naturally also promote the simultaneous esterification of the acid groups in any higher fatty acids employed in the reactions of this invention.

The halo-alkoxy derivatives prepared in accordance with this invention are suitable for a large variety of purposes, for instance, as plasticizers in synthetic masses, lubricant additives, pour point reducers, and the like. Moreover, since these products are potentially reactive at two points, i. e., the acid or ester group and the halogen atom, and further, since the alkoxy group may be derived arbitrarily from a wide variety of substituents, these compounds offer attractive possibilities as intermediates in the synthesis of more complex compounds.

With the foregoing discussion in mind, there are given herewith specific examples for the preparation of halo-alkoxy aliphatic acid derivatives in accordance with this invention. All parts given are by weight.

EXAMPLE I

*Chlor methoxy methyl stearate*

282 parts (1 mol) of oleic acid and 6 parts of paratoluene sulfonic acid were dissolved in 2800 parts (88 mols) of dry methanol. 71 parts (1 mol) of chlorine were then passed in at such a rate that the addition required a total of one hour, the temperature being maintained at 10° C. The stirring of the solution was continued for two additional hours, after which the reaction mass was subjected to vacuum distillation to remove the excess methanol and then washed with water to remove the sulfonic acid. There were obtained 340 parts (94% of the theoretical) of chlor methoxy methyl stearate, having a neutral equivalent of 355 and chlorine content of 11.2%.

EXAMPLE II

*Chlor butoxy butyl stearate*

282 parts (1 mol) of oleic acid, 6 parts of paratoluene sulfonic acid, 2800 parts (38 mols) of dry butanol and 71 parts (1 mol) of chlorine were reacted together in the same manner as were the corresponding reactants in Example I, with the exception that the reaction was conducted for four hours. There were obtained 330 parts (79% of the theoretical) of chlor butoxy butyl stearate. (Neutral equivalent 402; chlorine content, 9.9%.)

EXAMPLE III

A

| | |
|---|---|
| Oleic acid | 282 parts (1 mol) |
| Paratoluene sulfonic acid | 6 parts |
| Ethylene glycol | 2,800 parts (45 mols) |
| Chlorine | 71 parts (1 mol) |

Yield: 210 parts (52% theoretical) of glycol chlor hydroxy ethoxy stearate.

B

| | |
|---|---|
| Methyl linoleate | 297 parts (1 mol) |
| Paratoluene sulfonic acid | 6 parts |
| Methanol | 2,800 parts (88 mols) |
| Chlorine | 142 parts (2 mols) |

Yield: 350 parts (81.5% of theoretical) of methyl dichlor dimethoxy stearate (chlorine content 19.0%).

C

| | |
|---|---|
| Fatty acids derived from linseed oil | 280 parts (1 mol) |
| Paratoluene sulfonic acid | 6 parts |
| Methanol | 2,800 parts (88 mols) |
| Chlorine | 142 parts (2 mols) |

Yield: 365 parts (85% of theoretical) of methyl dichlor dimethoxy stearate (chlorine content, 19.7%).

D

| | |
|---|---|
| Oleic acid | 282 parts (1 mol) |
| Paratoluene sulfonic acid | 6 parts |
| Octanol | 3,800 parts (29 mols) |
| Chlorine | 71 parts (1 mol) |

Yield: 520 parts (88% theoretical) of octyl chlor oxyoctyl stearate (chlorine content, 7.9%).

The reactants listed in each of the above formulae A to D were reacted together exactly as were the corresponding reactants in Example I. The yield in each case is indicated just below the list of ingredients from which it was obtained.

EXAMPLE IV

*Teaseed oil chlor methoxy addition product*

890 parts (1 mol of triglycerides) of teaseed oil, 20 parts of paratoluene sulfonic acid and 2800 parts (88 mols) of methanol were mixed and cooled to 5° C. 210 parts (3 mols) of chlorine were passed in with continued cooling and stirring, the temperature being maintained between 5° and 10° C., the rate of chlorine addition being such that one hour was required for the addition of all the chlorine used. Thereafter, the reaction mixture was stirred for two additional hours, after which the mass was subjected to vacuum distillation to remove the excess methanol and washed to remove the paratoluene sulfonic acid. There were obtained 900 parts of a reaction product consisting of the original teaseed glycerides, to the double bonds of which chlorine atoms and methoxy groups had been added.

EXAMPLE V

*Chlor methoxy methyl stearate*

282 parts (1 mol) of oleic acid were dissolved in 1700 parts of methanol containing 14 parts of concentrated sulfuric acid. The solution was cooled to 5° C. and thereafter 71 parts (1 mol) of chlorine were passed in with stirring and cooling to maintain the temperature in the range 5–10° C. Stirring was continued for two additional hours, after which the reaction mass was vacuum distilled to remove the excess methanol, and then washed with water to remove the sulfuric acid. The washed residue was distilled to yield 336 parts (93% yield) of chlor methoxy methyl stearate having an acid value of 1.4, and chlorine content of 12.5%.

EXAMPLE VI

*Chlor methoxy 12 hydroxy methyl stearate*

62.6 parts (1 mol) of methyl ricinoleate were mixed with 250 parts of methanol and 1.5 parts of paratoluene sulfonic acid, and the mixture was cooled to 10° C. 14 parts (1 mol) of chlorine were passed into the mixture, with continued cooling to maintain the temperature at 10° C. Thereafter, the methanol was evaporated off from the mixture, and the residual mixture was washed with water to remove the p-toluene sulfonic acid. The resultant product was dried, yielding 72 parts of a light yellow oil consisting principally of isomeric chlor methoxy 12 hydroxy methyl stearates. The product contained 11.3% of chlorine.

EXAMPLE VII

*Brom methoxy methyl stearate*

296 parts (1 mol) of methyl oleate and 6 parts of paratoluene sulfonic acid were dissolved in 2800 parts of methanol. 160 parts (2 equivalents) of bromine were slowly added, while maintaining the temperature in the range 0°–5° C. The excess methanol was evaporated off, and the residual product washed and dried. There were obtained 375 parts (92% of the theoretical) of a product containing 19.2% of bromine.

EXAMPLE VIII

*Chlor secondary butoxy stearic acid*

28 parts (1 mol) of oleic acid, 1 part of paratoluene sulfonic acid and 235 parts of secondary butanol were mixed, and 7 parts (1 mol) of chlorine were passed into the mixture over a period of one half hour, the temperature being maintained at 10° C. throughout. The mixture was stirred for two hours, and then subjected to distillation to remove the excess butanol. The residue was saponified with potassium hydroxide, and the saponified mass was extracted with ether. The undissolved residue was then acidified to liberate the free fatty acids. Titration and chlorine determinations conducted upon these acids indicated that the product consisted principally of chlor secondary butoxy stearic acid.

EXAMPLE IX

*Chlor dodecyloxy stearic acid*

28 parts (1 mol) of oleic acid, 1 part of paratoluene sulfonic acid and 210 parts of dodecanol were mixed. Over a period of one half hour, 7 parts (1 mol) of chlorine were passed into the mixture with stirring and cooling to maintain the temperature below 15° C. Stirring was continued for 2 hours, after which the mixture was thrice extracted with successive 500-part portions of 2½% aqueous sodium hydroxide. The aqueous layers were acidified and subjected to extraction with ether, and the ether extract was washed with water, dried, and evaporated to leave 39 grams of residue consisting principally of chlor dodecyloxy stearic acid.

EXAMPLE X

*Chlor methoxy methyl butyrate*

86 parts (1 mol) of crotonic acid were dissolved in 600 parts of methanol containing 5 parts of paratoluene sulfonic acid. 71 parts (1 mol) of chlorine were then passed in, with cooling and stirring to maintain the temperature in the range 5–10° C. The stirring was continued for 1 hour after completion of the introduction of the chlorine after which the methanol was distilled off from the reaction mixture. The residue was taken up in ether, washed with 10% aqueous sodium chloride, and distilled, yielding 90 parts of a chlor methoxy methyl butyrate coming over in the range 68°–71° C. under 13 mm. pressure, and containing 26% chlorine.

EXAMPLE XI

*Metallic soaps of halo-alkoxy fatty acids*

Any of the esters prepared as described in the foregoing examples may be saponified with caustic alkalis and precipitated as heavy metal insoluble soaps. For instance, 162 parts (1 mol) of chlor methoxy methyl stearate prepared as described in Example I were reacted with 50 parts (1 mol) of 50% aqueous potassium hydroxide after which 232 parts (1 mol) of 20% aqueous barium chloride were added to the saponified mass. The resultant precipitated barium soap was filtered to remove the water and soluble salts, washed, and dried.

EXAMPLE XII

*Butyl amide of chlor methoxy stearic acid*

370 parts (1 mol) of chlor methoxy stearoyl chloride (prepared from the corresponding ester produced as described in Example I by saponification and acidification to yield the free acid, followed by treatment with $SOCl_2$) were mixed with 74 parts (1 mol) of butyl amine. The resulting amide was eminently suitable as a textile lubricant.

EXAMPLE XIII

*Dehydrohalogenation of chlor methoxy methyl stearate*

50 parts of chlor methoxy methyl stearate (prepared as described in Example I) were autoclaved for 6 hours at 160° C. with a solution of 20 parts of sodium hydroxide in 400 parts of water. The resultant mass was cooled and acidified to liberate the free fatty acids, which were then separated from the aqueous phase, dried and converted to the methyl esters by treatment with methanol and paratoluene sulfonic acid. The esterified mass was subjected to distillation under 1 mm. of vacuum, and there were recovered 20 parts of methoxy methyl octadecenoate which came over in the range 192°–198° C. and which had an iodine value of 69 (theory 77) and a saponification value of 183 (theory 172).

EXAMPLE XIV

*2-ethyl-hexyloxy methoxy methyl stearate*

36 parts (1 mol) of chlor methoxy methyl stearate were added to a mixture of 9.6 parts (4 mols) of sodium, 3 parts (1 mol) of methanol and 100 parts (7 mols) of 2-ethyl hexanol. The mixture was refluxed for 7 hours at temperatures around 230° C. The resultant mass was distilled under reduced pressure to remove the methanol and excess 2-ethyl hexanol. The undistilled residue was acidified to liberate the free fatty acids, which were separated from the mass, dried, converted to the methyl esters and distilled to yield 11 parts of 2-ethyl-hexyloxy methoxy methyl octadecenoate (B. P. 173°–184° C./2 mm.; iodine value 75; saponification value 136).

From the foregoing examples, it will be seen that the present invention provides a novel process for producing halo-alkoxy derivatives of higher fatty substances. The process operates upon cheap and readily procurable starting materials such as the commercial fats and oils, and acids, amides and the like derivatives obtained therefrom. The resultant compounds are useful in themselves for a variety of purposes, for instance as pour point depressants, plasticizers and the like, and furthermore may serve as intermediates in the preparation of compounds of still greater complexity by virtue of the reactivity of their chlorine and carbonyl groups, and also by virtue of the arbitrarily variable character of the alkoxy substituents therein.

We therefore claim:

1. A process of producing halo-alkoxy compounds which comprises introducing a halogen selected from the group consisting of chlorine and bromine into a mixture of a compound selected from the group consisting of unsaturated aliphatic monocarboxylic acids containing at least three carbon atoms and the esters and amides thereof and a hydroxy compound selected from the group consisting of primary and secondary aliphatic alcohols, the temperature of the resulting reaction being controlled so as not to exceed 25° C.

2. A process of producing a halo-alkoxy derivative of an aliphatic carboxylic acid which comprises introducing a halogen selected from the group consisting of chlorine and bromine into a mixture of an unsaturated aliphatic monocarboxylic acid containing at least three carbon atoms and a monohydric aliphatic alcohol other than a tertiary alcohol, the temperature of the resulting reaction being controlled so as not to exceed 25° C.

3. A process of producing a halo-methoxy derivative of an aliphatic carboxylic acid which comprises introducing a halogen selected from the group consisting of chlorine and bromine into a mixture of an unsaturated aliphatic monocarboxylic acid containing at least three carbon atoms and methanol, the temperature of the resulting reaction being controlled so as not to exceed 25° C.

4. A process of producing a chlor-methoxy derivative of an aliphatic monocarboxylic acid which comprises introducing chlorine into a mixture of an unsaturated aliphatic carboxylic acid containing at least three carbon atoms and methanol, the temperature of the resulting reaction being controlled so as not to exceed 25° C.

5. A process of producing chlor-methoxy methyl stearate which comprises introducing chlorine into a mixture of oleic acid and methanol, the temperature of the resulting reaction being controlled so as not to exceed 25° C.

6. A process of producing a chlor-alkoxy ester of stearic acid which comprises introducing chlorine into a mixture of oleic acid and a monohydric aliphatic alcohol other than a tertiary alcohol, the temperature of the resulting reaction being controlled so as not to exceed 25° C.

7. A process of producing a halo-alkoxy derivative of an aliphatic carboxylic acid ester which comprises introducing a halogen selected from the group consisting of chlorine and bromine into a mixture of an ester of an unsaturated aliphatic monocarboxylic acid containing at least three carbon atoms and a monohydric aliphatic alcohol, the temperature of the resulting reaction being controlled so as not to exceed 25° C.

8. A process of producing a chlor-methoxy derivative of an aliphatic monocarboxylic acid ester which comprises introducing chlorine into a mixture of an ester of an unsaturated aliphatic carboxylic acid containing at least three carbon atoms and methanol, the temperature of the resulting reaction being controlled so as not to exceed 25° C.

9. A process of producing a halo-alkoxy derivative of a fatty oil which comprises introducing a halogen selected from the group consisting of chlorine and bromine into a mixture of an unsaturated fatty glyceride oil and a monohydric aliphatic alcohol other than a tertiary alcohol, the temperature of the resulting reaction being controlled so as not to exceed 25° C.

10. A process of producing a chlor-methoxy derivative of a fatty oil which comprises introducing chlorine into a mixture of an unsaturated fatty glyceride oil and methanol, the temperature of the resulting reaction being controlled so as not to exceed 25° C.

11. A process of producing a halo-alkoxy derivative of an aliphatic carboxylic acid which comprises introducing a halogen selected from the group consisting of chlorine and bromine into a mixture of an unsaturated aliphatic monocarboxylic acid containing at least three carbon atoms, an acid catalyst and a monohydric aliphatic alcohol, the temperature of the resulting reaction being controlled so as not to exceed 25° C.

12. A process of producing a chlor-methoxy derivative of an aliphatic monocarboxylic acid which comprises introducing chlorine into a mixture of an unsaturated aliphatic carboxylic acid containing at least three carbon atoms, an acid catalyst and methanol, the temperature of the resulting reaction being controlled so as not to exceed 25° C.

13. A process of producing chlor-methoxy methyl stearate which comprises introducing chlorine into a mixture of oleic acid, an acid catalyst and methanol, the temperature of the resulting reaction being controlled so as not to exceed 25° C.

14. The metal salts of chlor-alkoxy monocarboxylic aliphatic acids containing at least three carbon atoms.

15. The metal salts of chlor-alkoxy stearic acid.

16. The metal salts of chlor-methoxy stearic acid.

17. A process of producing a chlor-alkoxy derivative of an aliphatic carboxylic acid which comprises introducing chlorine into a mixture of an unsaturated aliphatic carboxylic acid containing at least three carbon atoms and a monohydric alcohol, the temperature of the resulting reaction being controlled so as not to exceed 25° C. and saponifying the chlor-alkoxy compound by means of an alkali to form the corresponding salt.

18. A process of producing a chlor-alkoxy derivative of stearic acid which comprises introducing chlorine into a mixture of oleic acid and a monohydric alcohol, the temperature of the resulting reaction being controlled so as not to exceed 25° C. and saponifying the chlor-alkoxy compound by means of an alkali to form the corresponding salt.

19. A process of producing a chlor-methoxy derivative of stearic acid which comprises introducing chlorine into a mixture of oleic acid and methanol, the temperature of the resulting reaction being controlled so as not to exceed 25° C. and saponifying the chlor-alkoxy compound by means of an alkali to form the corresponding salt.

DONALD PRICE.
RICHARD GRIFFITH.